Aug. 19, 1924.
1,505,668
C. R. PRIGEL
PLOWPOINT
Filed Aug. 23, 1922.
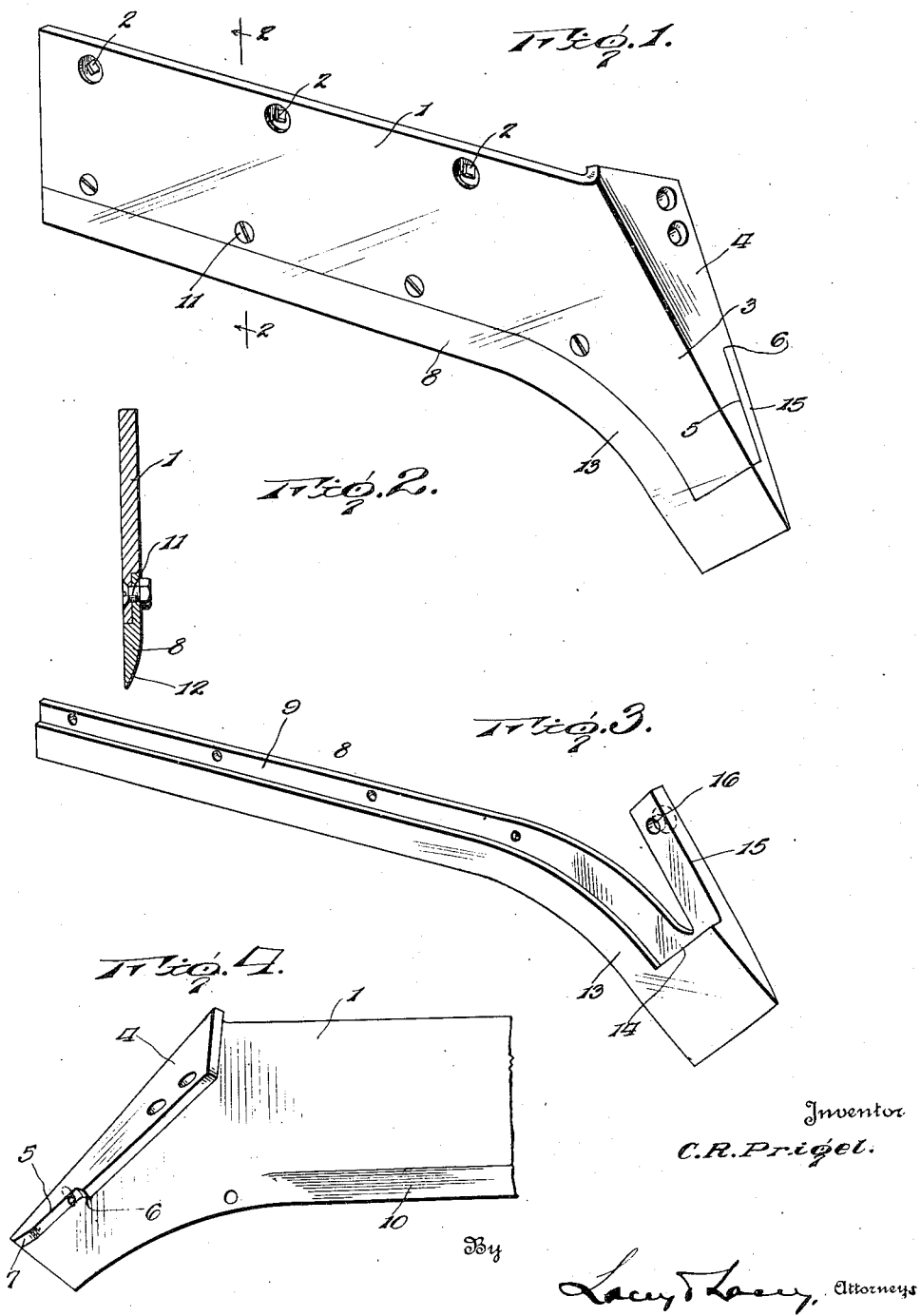
Inventor
C.R. Prigel.
By
Lacy & Lacy, Attorneys Patented Aug. 19, 1924.

1,505,668

UNITED STATES PATENT OFFICE.

CHARLES R. PRIGEL, OF HOME CITY, KANSAS, ASSIGNOR OF ONE-FOURTH TO HENRY SCHIMMELS AND ONE-FOURTH TO W. ROY LEWIS, BOTH OF HOME CITY, KANSAS.

PLOWPOINT.

Application filed August 23, 1922. Serial No. 583,801.

*To all whom it may concern:*

Be it known that I, CHARLES R. PRIGEL, a citizen of the United States, residing at Home City, in the county of Marshall and State of Kansas, have invented certain new and useful Improvements in Plowpoints, of which the following is a specification.

This invention relates to plows and has for its object the provision of a construction whereby the cutting edge of a plow share may be renewed without requiring the provision of an entirely new share. The invention also seeks to provide a plow share with a removable cutting edge which, when in place, will be securely locked to the share so that it will not be apt to work loose while in use, and other incidental objects of the invention will hereinafter appear.

In the accompanying drawings, which illustrate my invention,—

Figure 1 is a perspective view of a plow share having my improved cutter secured thereto;

Fig. 2 is a transverse section on the line 2—2 of Fig. 1;

Fig. 3 is a perspective view of the cutter;

Fig. 4 is a perspective view of a portion of the share.

The plow share 1 is substantially of the usual form provided with countersunk openings 2 adjacent its upper edge, through which fastening bolts may be inserted to secure it to the lower edge of the mold-board in the usual manner and at its working end is extended forwardly, as shown at 3, to provide a point, while projecting downwardly from said working end is a lug or plate 4 to which the landside may be secured in the usual manner. The lower edge of the landside-attaching lug 4 is recesed at its forward end, as shown at 5, whereby a transverse shoulder 6 is provided, the forward extremity of said lug being beveled or tapered, as indicated at 7. The cutter 8 is so formed as to be co-extensive with the lower forward edge of the share and the point thereof and is correspondingly shaped. The upper rear edge of the cutter is rabbeted or recessed longitudinally in its front or upper side, as shown at 9, to engage with the rabbeted side 10 of the share, and fastening bolts 11 are inserted through the rabbeted portions of the share and the cutter, as shown clearly in Fig. 2, to secure the parts detachably but firmly together. The share and the cutter are of equal thickness so that the surfaces thereof will be flush both at the front or upper sides and the rear or under sides of the elements and, consequently, there will be no choking of the plow while in use. The working edge of the cutter is beveled upon its under rear side, as shown at 12, whereby a cutting edge will be produced and the forward portion of the cutter is curved forwardly, as shown at 13, so as to fit closely to the point 3 of the share. Upon its front face, the cutter is provided with a transverse shoulder 14 which will abut the extremity of the point 3 and this shoulder may conveniently be formed by continuing the rabbet 9 of the cutter around the curved portion 13 thereof, as clearly shown in Fig. 3. Extending rearwardly from the shoulder 14 on the rear side of the cutter is a tongue 15 which is adapted to fit within the recess 5 of the landside lug 4 and be secured thereto by a suitable bolt inserted through an opening 16 adjacent the extremity of the tongue and into a socket provided therefor in the forward wall of the recess 5, as will be readily understood, the extremity of the tongue abutting the transverse shoulder 6 on the landside lug.

The landside and the mold-board are secured to the share 1 in the usual manner and the plow is operated in the same manner as an ordinary plow is used. It will be readily noted that I have provided a detachable cutting edge which may be readily secured to or removed from the share so that, when one cutter has been worn down so as to be no longer available, it may be easily detached and a new cutter substituted therefor. The peculiar construction of the cutter and the share will effect a mutual interlocking or bracing engagement of the parts so that, when in use, the cutter will be effectually held to the share and cannot be easily accidentally removed therefrom. The exposed surfaces at the joints all are flush so that there are no obstructions presented to the soil which would tend to obstruct the easy passage of the soil from the point or share or landside and accumulation of dirt upon the plow with consequent choking thereof is, therefore, avoided. The rabbet or channel 10 of the share and the rabbet or channel 9 on the cutter are co-extensive in form and dimensions so that, when the cutter is in place, mutually engaging and bracing shoulders and surfaces are formed which abut each other so that relative rocking motion of the cutter or the share is prevented. The detachable cutter can be produced at a cost considerably less than the cost of the shares now generally employed and the substitution of a new cutter for a worn cutter may be effected in a few minutes without the use of skilled labor or any special tools so that by the use of my device a considerable saving may be effected by users of plows and similar implements.

Having thus described the invention, what is claimed as new is:

The improvement in plows herein set forth consisting of a share provided with a channel along its lower front edge in its rear side and provided at its point end with a downwardly projecting landside-attaching lug having its forward lower edge recessed thereby presenting a transverse shoulder in rear of the lower forward extremity of the said lug, and a cutter having a longitudinally extending rabbet at its upper rear edge in its front side to interlockingly engage with the rabbet at the lower front edge of the share, said rabbet extending across the point of the cutter to define a transverse shoulder on the upper front side thereof to abut the extremity of the point end of the share and having a rearwardly extending tongue projecting from the base of said shoulder to fit within the recess at the lower forward end of the landside lug and having its upper extremity abutting the transverse shoulder at the upper end of said recess, and fastening devices inserted through the rabbeted portions in the share and the cutter and through the said tongue into the recessed portion of the landside lug.

In testimony whereof I affix my signature.

CHARLES R. PRIGEL. [L. S.]